(12) United States Patent
Soldo

(10) Patent No.: US 7,552,910 B2
(45) Date of Patent: Jun. 30, 2009

(54) HANDLING DEVICE ASSOCIABLE TO AN ON-OFF VALVE FOR A FLUID IN A DUCT

(75) Inventor: Giovanni Soldo, Lonato (IT)

(73) Assignee: Soldo S.r.l., Desenzano Del Gardia (Brescia) (IT)

( * ) Notice: Subject to any disclaimer, the term of this patent is extended or adjusted under 35 U.S.C. 154(b) by 519 days.

(21) Appl. No.: 11/165,432

(22) Filed: Jun. 23, 2005

(65) Prior Publication Data
US 2006/0000996 A1    Jan. 5, 2006

(30) Foreign Application Priority Data
Jul. 2, 2004  (IT)  ............... BS2004A0078

(51) Int. Cl.
*F16K 31/00* (2006.01)
(52) U.S. Cl. ..................... 251/292; 251/243
(58) Field of Classification Search ............ 251/292, 251/291, 243
See application file for complete search history.

(56) References Cited

U.S. PATENT DOCUMENTS

| | | | |
|---|---|---|---|
| 443,326 A | 12/1890 | Leverich | |
| 3,214,133 A * | 10/1965 | Rodgers et al. | 251/175 |
| 3,533,658 A * | 10/1970 | Gropp | 297/362.13 |
| D225,736 S * | 1/1973 | Mango et al. | D23/226 |
| 4,258,903 A | 3/1981 | Stevenson | |
| 4,400,892 A * | 8/1983 | Tebaldi | 34/95.1 |
| 4,666,085 A * | 5/1987 | Liaw | 239/394 |
| 4,684,037 A * | 8/1987 | Gnutti et al. | 251/253 |
| 4,903,897 A * | 2/1990 | Hayes | 239/394 |
| 5,630,548 A * | 5/1997 | Chih | 239/394 |
| 5,772,121 A * | 6/1998 | Wang | 239/394 |
| D404,798 S * | 1/1999 | Goodin | D23/226 |
| D407,140 S * | 3/1999 | Heren | D23/223 |
| 5,964,415 A * | 10/1999 | Hadar | 239/317 |
| 5,996,978 A * | 12/1999 | Asanuma et al. | 267/34 |
| D421,483 S * | 3/2000 | Patrick | D23/226 |
| D422,056 S * | 3/2000 | Patrick | D23/226 |
| D422,057 S * | 3/2000 | Garza | D23/226 |
| 6,036,117 A * | 3/2000 | Heren et al. | 239/456 |
| D422,338 S * | 4/2000 | Patrick | D23/226 |
| 6,145,161 A * | 11/2000 | Jou | 15/331 |
| 6,397,476 B1 * | 6/2002 | Onion | 30/160 |
| 6,612,507 B1 * | 9/2003 | Meyer et al. | 239/394 |
| 6,959,909 B2 * | 11/2005 | Bancroft et al. | 251/109 |
| 7,080,795 B2 * | 7/2006 | Chen | 239/394 |
| 7,188,787 B2 * | 3/2007 | Cannon et al. | 239/526 |

FOREIGN PATENT DOCUMENTS

| | | |
|---|---|---|
| EP | 0572836 | 5/1993 |
| FR | 2640024 | 12/1988 |

* cited by examiner

*Primary Examiner*—John Rivell
*Assistant Examiner*—Andrew J Rost
(74) *Attorney, Agent, or Firm*—Hoffmann & Baron, LLP

(57) ABSTRACT

A handling device is associable to an on-off valve and comprises handling means suitable for being gripped by an operator, a connection device for supporting said handling means, spring back means for returning said valve from the open configuration to the closed configuration (or vice versa) and a positioning and support device through which the handling means support the spring back means in a position suitable for operating properly.

18 Claims, 10 Drawing Sheets

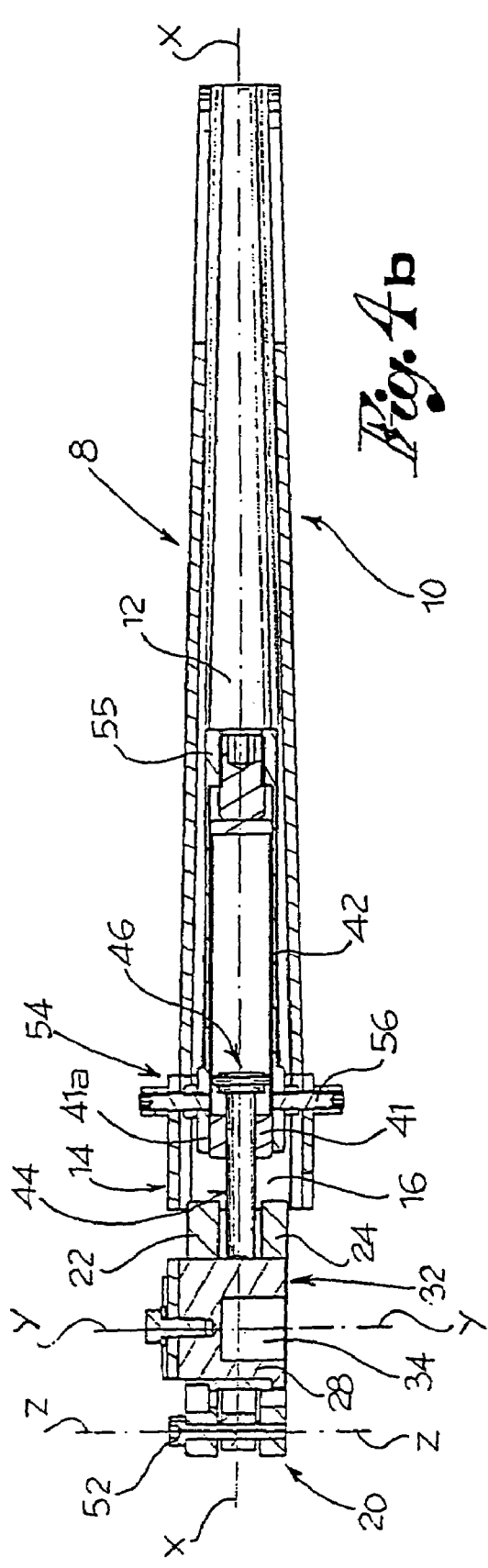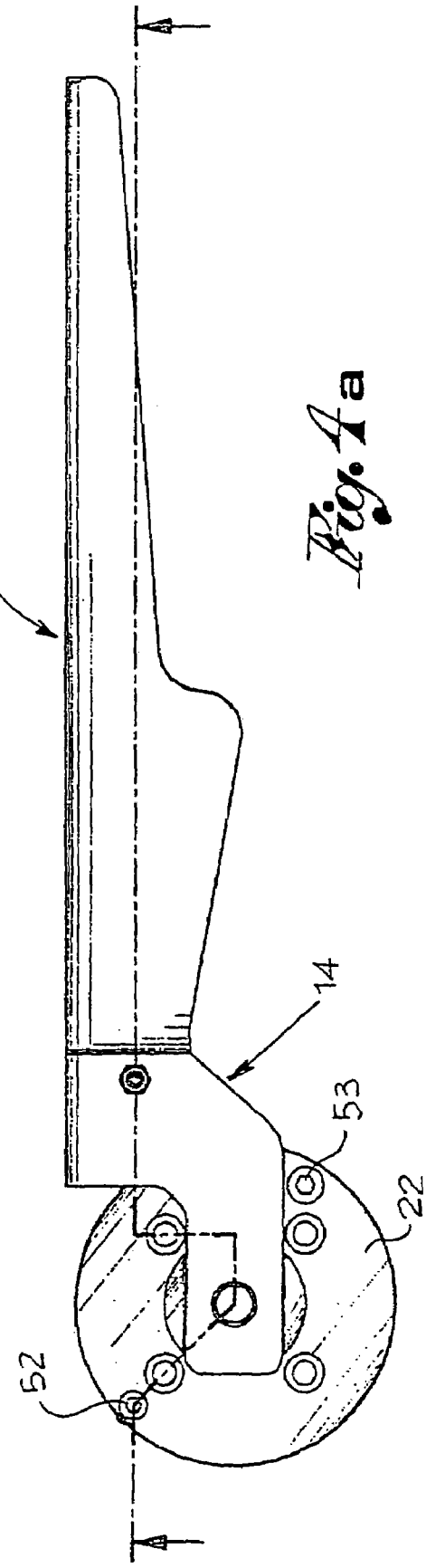

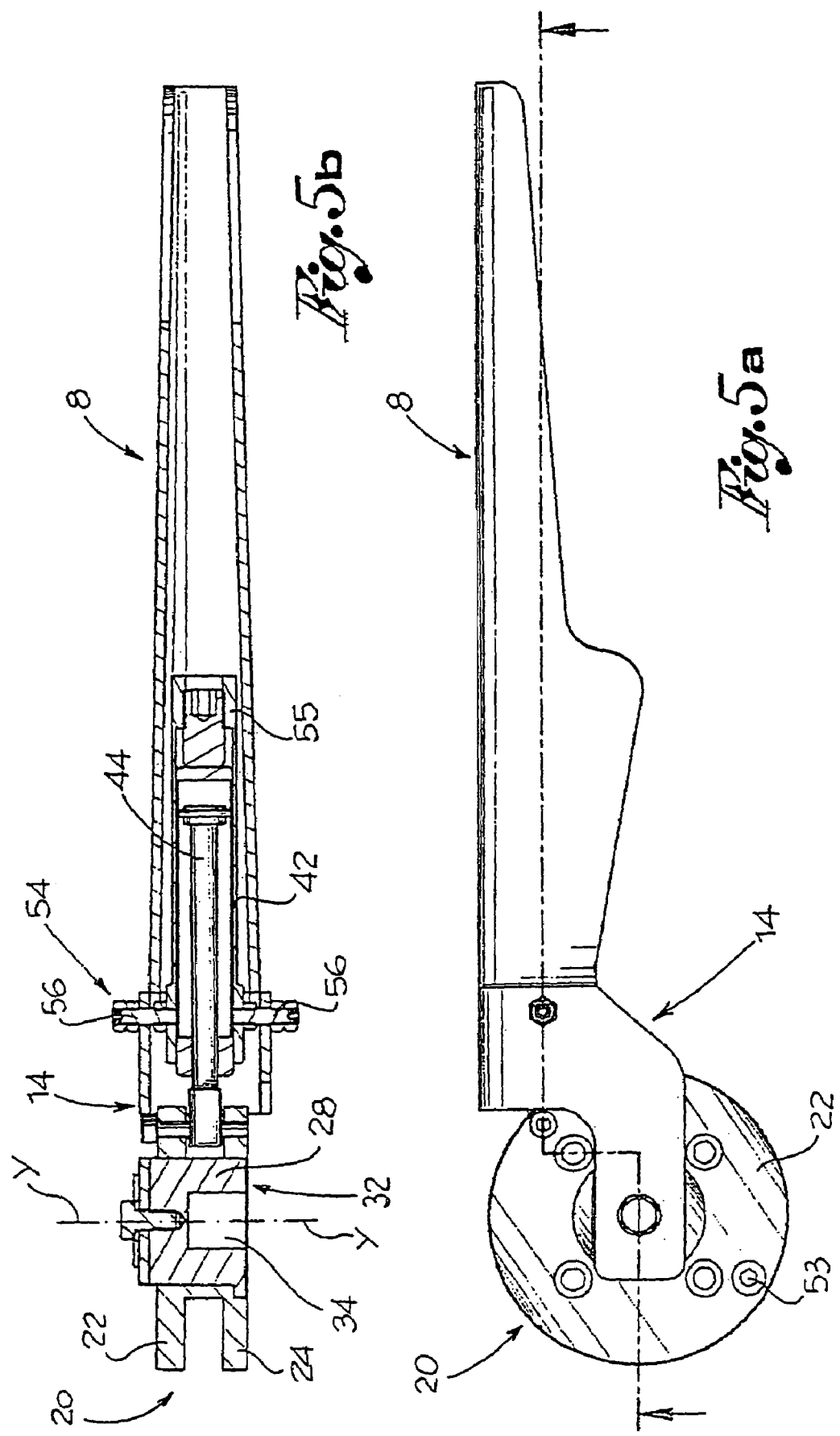

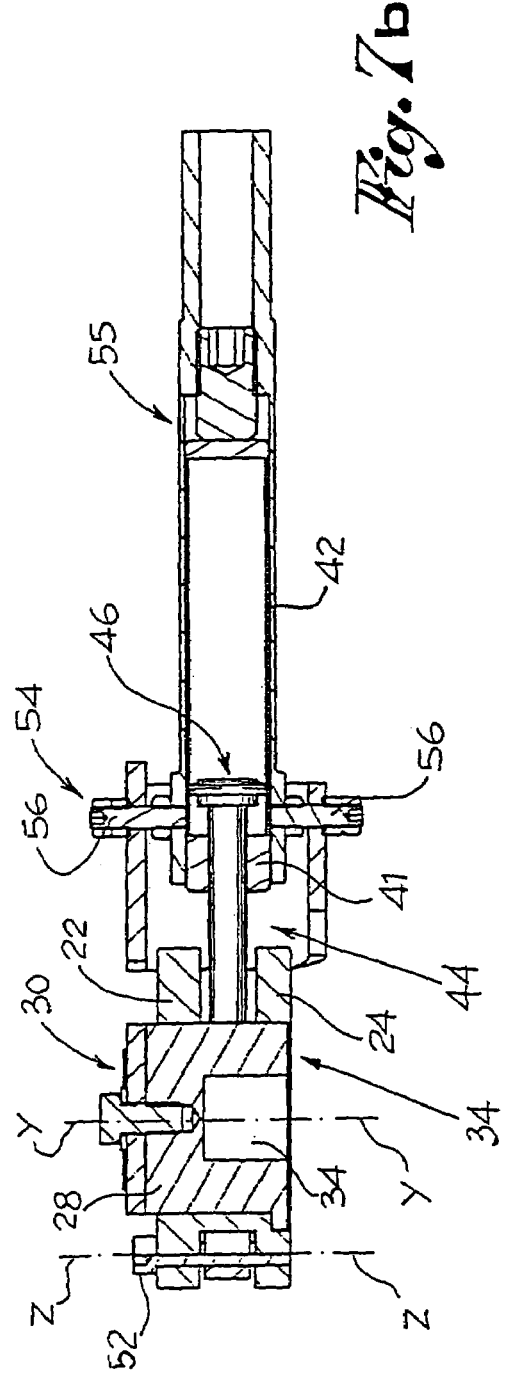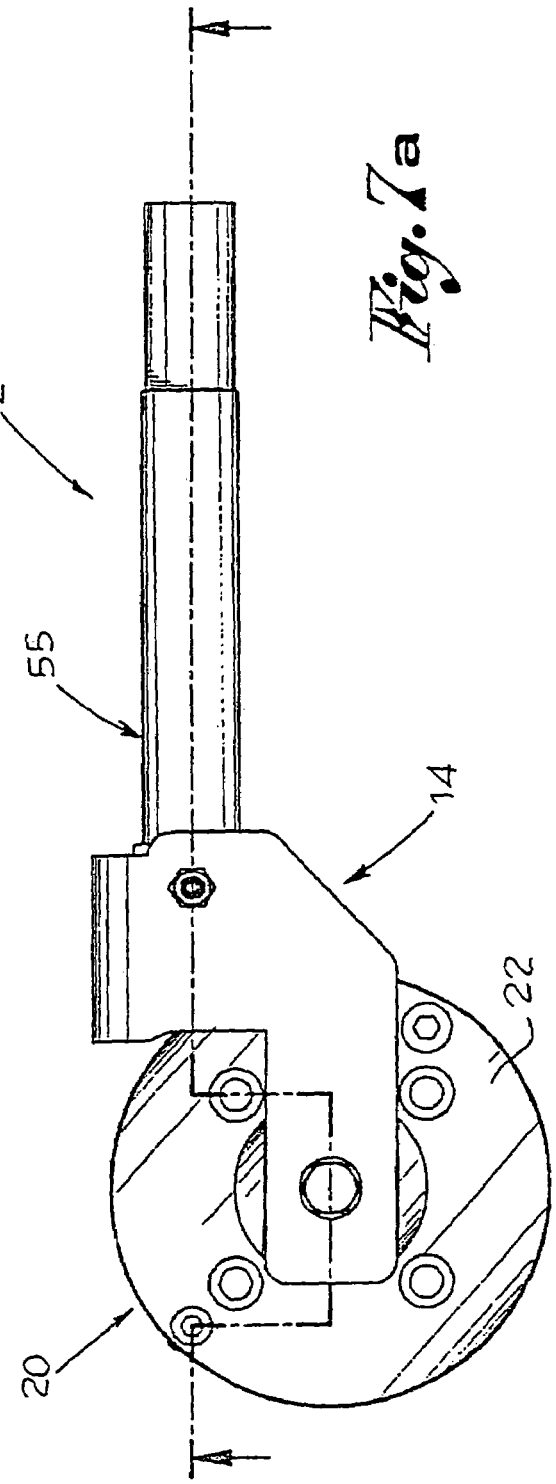

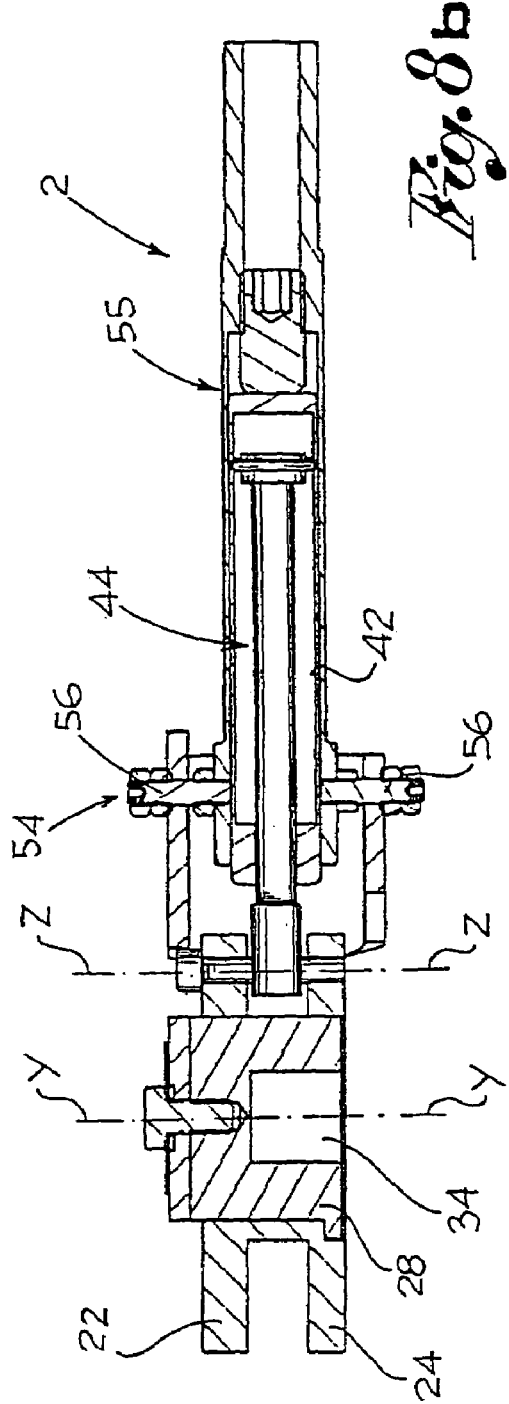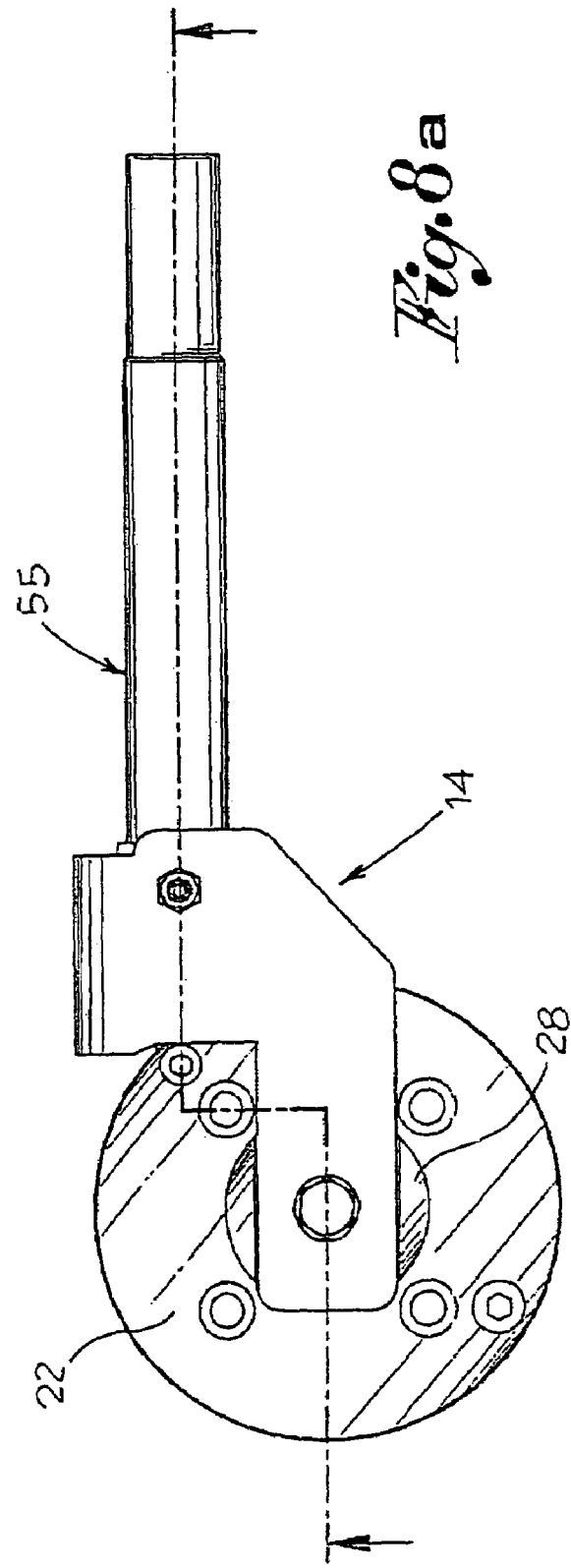

HANDLING DEVICE ASSOCIABLE TO AN ON-OFF VALVE FOR A FLUID IN A DUCT

This application is the U.S. National Phase of Italian Patent Application Number BS2004A000078 filed on 2 Jul. 2004, which is incorporated by reference.

BACKGROUND OF THE INVENTION

The object of the present invention is a handling device associable to an on-off valve for a fluid in a duct.

Some handling devices exhibit a lever for opening and/or closing the valve. In the closed configuration, said valve prevents the fluid flow into the duct. On the other hand, in the open configuration, the valve allows the fluid flow into the duct.

Especially in industrial applications that imply hazardous or harmful fluids, said handling devices exhibit a spring that allows the automatic return of the lever from the position wherein the valve is open to the position wherein the valve is closed.

An example of embodiment according to what described above is shown in document EP-A1-572836.

However, solutions like that described above exhibit a quick deterioration of the sealing capacity of the of the valve on-off device, mainly due to the actions exerted directly thereon following the lever actuation by the operator.

In other solutions, the lever is supported by a flange associated to the valve body and the spring is housed in the flange.

An example of what described above is shown in document FR-A1-2640024.

However, also these solutions exhibit some disadvantages, mainly due to considerable overall dimensions of the flange.

BRIEF SUMMARY OF THE INVENTION

The object of the present invention is to provide a handling device associable to an on-off valve for a fluid in a duct which should solve the problems mentioned above while overcoming the disadvantages shown by the known solutions.

BRIEF DESCRIPTION OF THE SEVERAL VIEWS OF THE DRAWINGS

The features and advantages of the handling device according to the present invention will appear more clearly from the following description of an embodiment, made by way of a non-limiting example with reference to the annexed drawings, wherein:

FIGS. 4a and 4b respectively show a plan view and a side section of the device of FIG. 3, in a rest configuration;

FIGS. 5a and 5b respectively show a plan view and a side section of the handling device of FIG. 3, in an active configuration;

FIGS. 7a and 7b respectively show a plan view and a side section of the device of FIG. 6, in a rest configuration;

FIGS. 8a and 8b respectively show a plan view and a side section of the handling device of FIG. 6, in an active configuration;

FIG. 9b shows a plan section view of the valve unit of FIG. 9a.

DETAILED DESCRIPTION OF THE INVENTION

Figure 1:
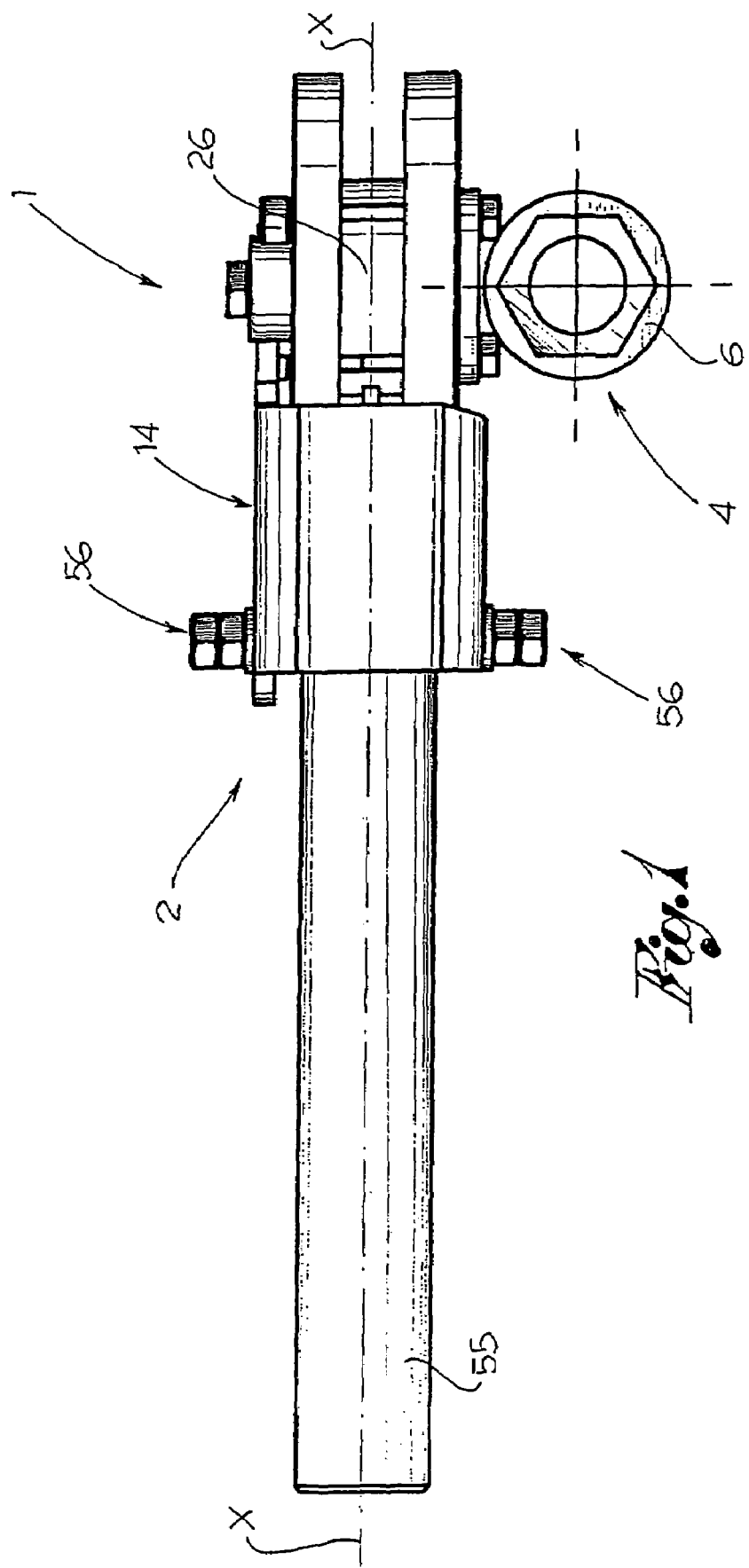
FIG. 1 shows a side view of a valve unit comprising a handling device according to a first embodiment.
Figure 2:
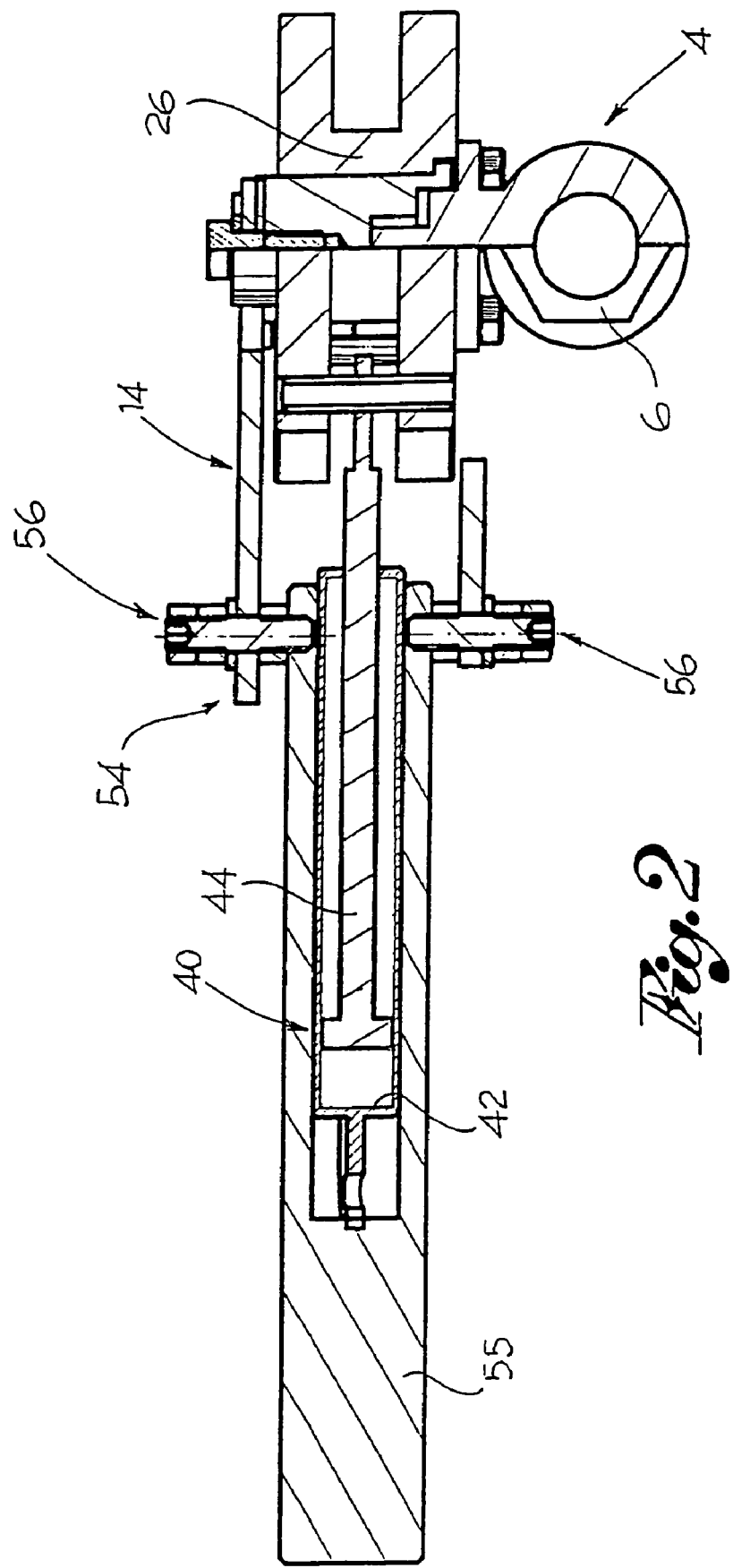
FIG. 2 shows a partial section view of the valve unit of FIG. 1.
Figure 3:
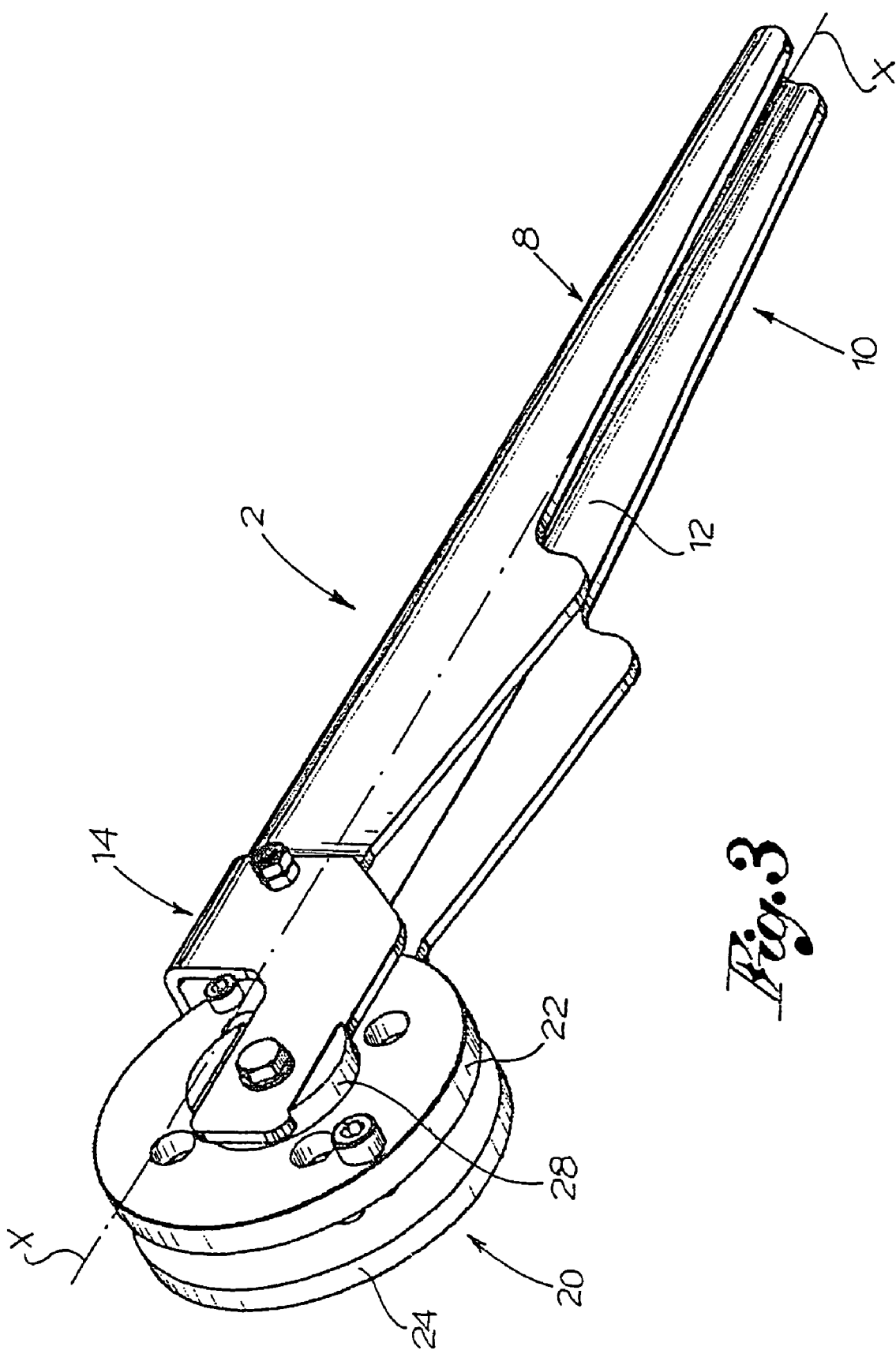
FIG. 3 shows a perspective view of the handling device according to a further embodiment.
Figure 6:
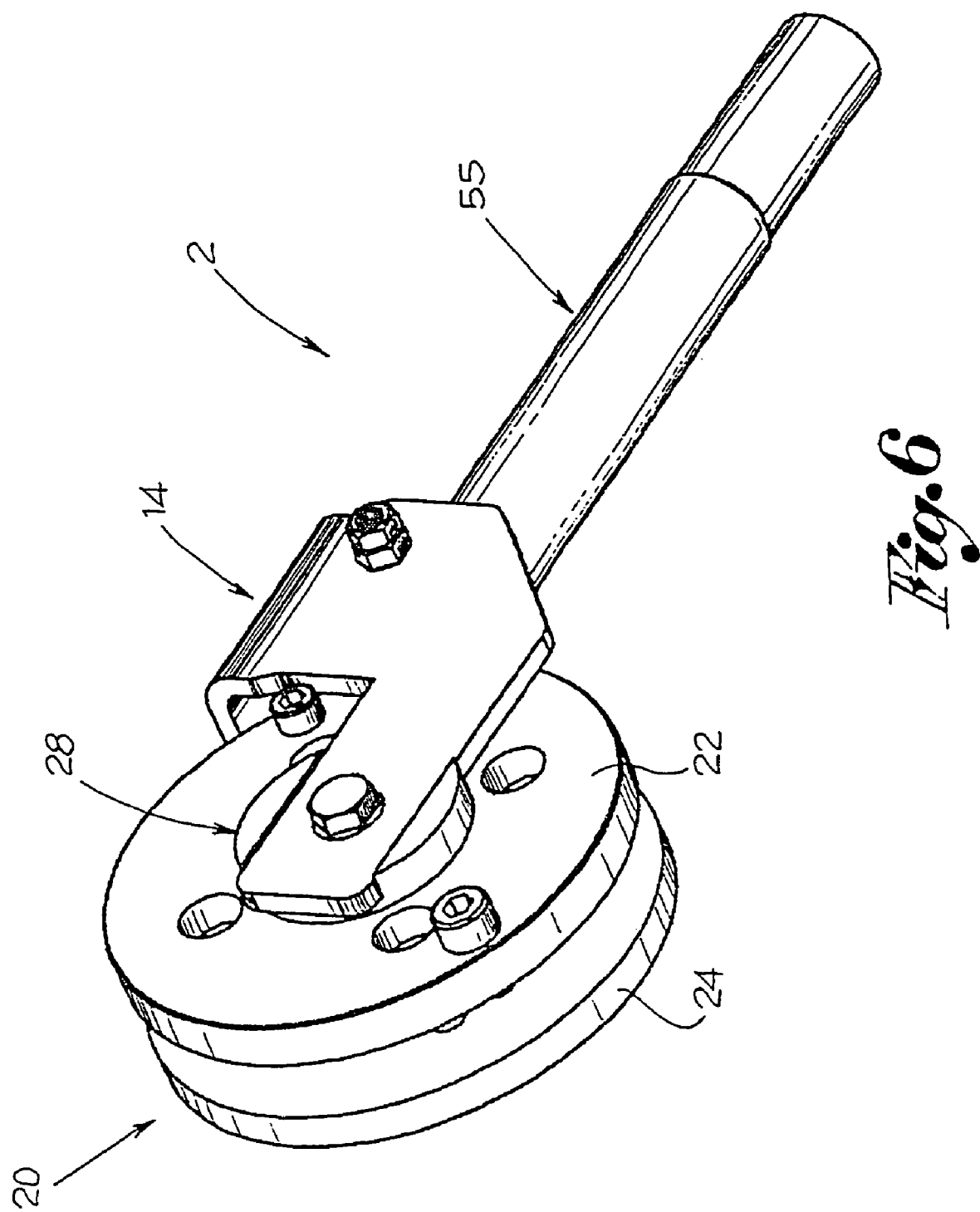
FIG. 6 shows a perspective view of the handling device according to a further embodiment.

With reference to the annexed drawings, reference numeral 1 globally indicates a valve unit comprising a handling device 2 associable to an on-off valve 4 for a fluid in a duct.

Valve 4 is suitable for switching from a closed or rest configuration, wherein it prevents the fluid flow into the duct, to an open or active configuration, wherein it allows the fluid flow into said duct.

It is clear that for the valve associable to the handling device, the rest configuration could be that in which it allows the fluid flow and, on the other hand, the active configuration could be that in which it prevents said flow.

Valve 4 comprises a valve body 6 suitable for housing an on-off device. Said on-off device, suitably positioned, is suitable for preventing and/or allowing the fluid flow into the duct.

The handling device 2 comprises handling means suitable for being gripped by an operator for switching the valve from the closed configuration to the open configuration and vice versa.

In one embodiment, said handling means comprise a lever 8 having prevailing extension along a lever axis X-X.

Preferably, said lever 8 exhibits a first lever portion 10 having a profile, that is, a cross section, obtainable with a plane perpendicular to said lever axis X-X, shaped as a "C".

In other words, said lever 8 is internally hollow, thus defining a housing 12, also having prevailing extension along said lever axis X-X.

Moreover, said handling means comprise a flange 14 jointed to said first portion 10 of lever 8, also exhibiting such profile as to determine a cavity 16 without interruption with said housing 12.

The handling device 2 further comprises a connection device 20 associable to said valve body 6 for supporting said handling means.

An axis of rotation Y-Y, perpendicular to said lever axis X-X, defines relative to said connection device.

In one embodiment, said connection device 20 comprises a top plate 22 and a bottom plate 24, preferably spaced by a spacing element 26, inserted thereinbetween.

Said connection device 20 is associable to said valve body by preferably releasable fixing means, for example by at least one bolt.

In a preferred embodiment, said bolts pass through said top plate 22 and said spacing element 26 for the further connection of the top plate to the spacing element 26 and of the spacing element 26 to the bottom plate.

Said connection device 20 further comprises an engagement element 28, freely rotating about said axis of rotation Y-Y and suitable for being connected, at a top end 30, to said flange 14 of the handling means.

At a bottom end 32, opposed to said top end 30 along said axis of rotation Y-Y, said engagement element 28 exhibits a seat 34 suitable for engaging with the on-off device of valve 4 for opening and/or closing it.

In an embodiment variation, said engagement occurs through a further intermediate joint.

The handling device 2 further comprises spring back means suitable for influencing said handling means for returning the valve from the open configuration to the closed configuration.

In one embodiment, said spring back means comprise a gas spring 40.

In particular, said spring back means comprise a hollow cylinder 42, loadable with a gas under pressure, and a piston 44, alternately translatable into said cylinder 42.

Piston 44 exhibits a head 46 sealingly translatable into said cylinder for putting the gas contained therein under pressure.

Moreover, said spring back means comprise sealing means suitable for limiting the gas discharge from the cylinder.

For example, said sealing means comprise a plug 41 the sealingly closes, at a first end 41a, cylinder 42 and through which piston 44 sealingly moves.

At the end not engaged with cylinder 42, piston 44 cooperates with said connection device 20.

In particular, piston 44 is hinged to a hinging element 52, having a hinging axis Z-Z, fixed to the connection device.

Said hinging element is obtained, for example, with a pin passing through said top plate 22 and fixed to said bottom plate 24.

The axis of rotation Y-Y of the engagement element 28 is parallel and separate from the hinging axis Z-Z of the hinging element 52.

Said spring back means further comprise a limit switch pin 53, fixed to the bottom plate 24 of the connection device 20.

Said handling means support the spring back means in a position suitable for operating correctly.

In particular, said gas spring 40 is supported by flange 14 and/or by the first portion 10 of lever 8.

In a preferred embodiment, cylinder 42 of gas spring 40 is housed in housing 12 of lever 8 and/or in cavity 16 of flange 14.

Said cylinder 42 is held into position by a positioning and support device 54.

Said positioning and support device 54 comprises a lining 55, inside which said cylinder 42 is housed.

In a further embodiment, said positioning and support device 54 comprises at least one pair of pins 56, suitable for connecting said lining 55 to flange 14.

In particular, each pin passes through the wall of flange 14 or the wall of lever 8 and cooperates with said lining 55.

Said pins 56 are preferably aligned with one another or arranged diametrically opposed relative to said cylinder.

The positioning and support device 54 is suitable for correctly positioning said spring back means.

In other words, said device 54 prevents the misalignment between the axis of cylinder 42 and that of piston 44, preventing jibbing of the latter while sliding into the cylinder.

Below is a description of a further variation of embodiment of the handling device according to the present invention, with reference to FIGS. 6 to 8b. For clarity of description, same parts are denoted with same reference numerals.

In said variation of embodiment the handling means, suitable for being gripped by an operator for switching the valve from the closed configuration to the open configuration and vice versa, comprise said lining 55 of the positioning and support device 54.

In particular, said lining 55 is at least partly accessible by the operator so as to be gripped to switch the valve from the closed configuration to the open configuration and vice versa.

Figure 9A:
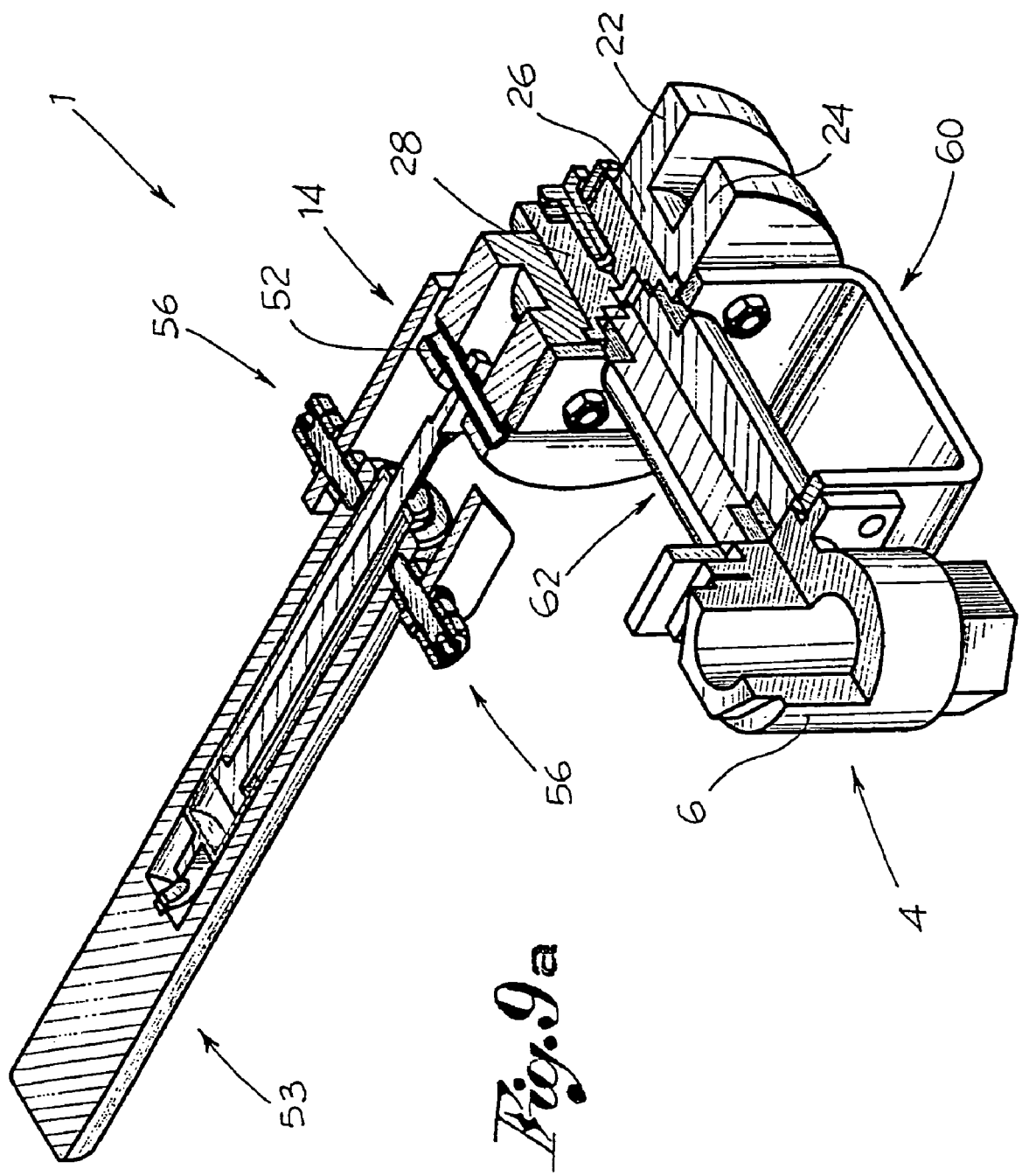
FIG. 9a shows an axonometric partial section view of a valve unit comprising the handling device according to a further embodiment.
Figure 9B:
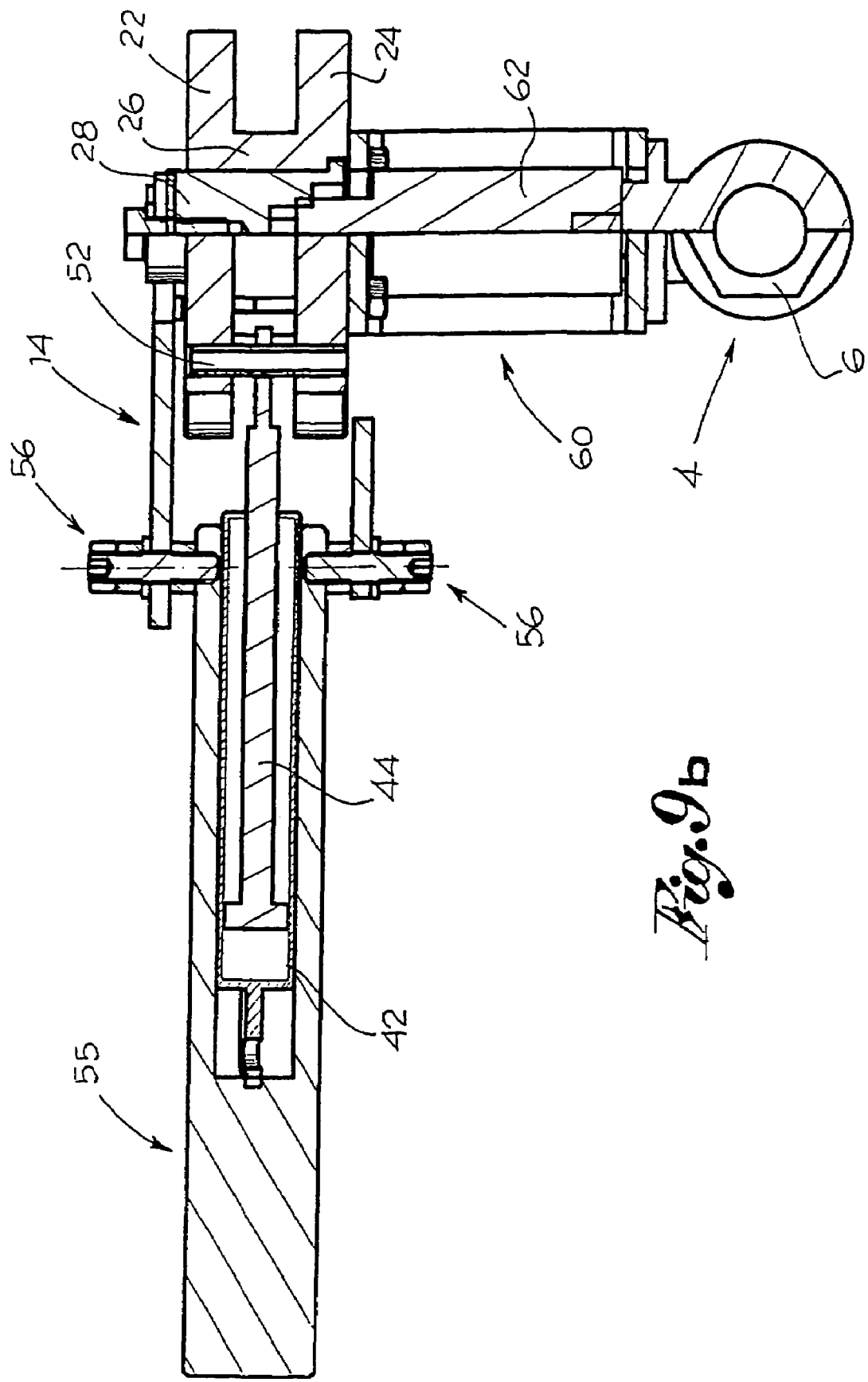

Below is a description of an even further variation of embodiment of the handling device according to the present invention, with reference to FIGS. 9a and 9b. For clarity of description, same parts are denoted with same reference numerals.

IN said variation of embodiment, the handling device further comprises a bracket 60, suitable for the connection of said device to the valve body 6 of said valve 4.

Moreover, said handling device comprises a junction element 62, suitable for the connection between the engagement element 28 and the on-off device of valve 4.

Bracket 60 allows adapting the dimensions and/or the shape of the connection device 20 of said handling device to the dimensions and/or the shape of the valve body, in any case limiting or nullifying undesired actions transmitted by the operator to the valve on-off device.

The junction element 62 allows adapting the dimensions and/or the shape of the valve on-off device to the dimensions and/or the shape of the engagement element 28.

In the normal use of the handling device described above, the connection device 20, directly or by said bracket 60 and/or said junction element 62, is associated to the valve body 6 of valve 4, for example through at least one bolt.

The end of the on-off device of the valve is housed into seat 34 obtained at the bottom end 32 of the engagement element 28 or in a seat obtained at the end of said junction element 62.

Advantageously, said seat 34 engages said on-off device in rotation while it realises a clearance for preventing the transmission of axial stresses from said engagement element to said on-off device.

By rotating the handling means of said handling device, that is, rotating lever 8 or cylinder 42 about said axis of rotation Y-Y, the on-off device switches to the open configuration.

In particular, flange 14 that carries cylinder 42, rotates about the axis of rotation Y-Y, while piston head 46 rotates about the hinging axis Z-Z of the hinging element 52.

Head 46 of the piston, since said hinging axis Z-Z is not aligned with said axis of rotation Y-Y, translates into cylinder 42, reducing the volume of the pressure chamber and putting the fluid contained therein under pressure.

At the end of the operator's action, that is when lever 8 or cylinder 42 are not gripped anymore, the action of the fluid under pressure acts on piston 44, returning the handling device to the closed configuration.

Flange 14, actuated by said spring back means, rotates until it abuts against the limit switch pin.

During the operator's action and during the return from the open configuration to the closed configuration, said positioning and support device 54 keeps the spring back means in a position suitable for a correct operation, ensuring the alignment between said piston and said cylinder.

Unusually, the handling device according to the present invention uses the lever effect for easy opening and/or closing of the valve, exhibits limited overall dimensions and is free from malfunction in the valve opening and/or closing.

Advantageously, moreover, the handling device is light and easily associable to the valve body.

According to an advantageous aspect, the handling device is connected to the valve body so that any operator's actions that do not generate a torque useful for opening and/or closing the valve, are not transmitted to the on-off device of said valve.

In other words, axial and/or tangential actions relative to the axis of rotation are not transmitted to the on-off device but to the valve body, thus improving the reliability of the valve itself.

A man skilled in the art can make several variations and changes to the handling device described above in order to solve specific and incidental problems.

For example, said spring back means in a variation of embodiment comprise a mechanical spring device, for example comprising a helical spring.

It is clear that also such variations fall within the scope of protection as defined by the following claims.

What is claimed is:

1. A handling device associable to an on-off valve of a fluid in a duct, wherein said valve comprises a valve body and a fluid on-off device housed into said valve body, said valve being suitable for switching from a closed configuration, wherein it prevents the fluid flow into said duct, to an open configuration, wherein it allows the fluid flow into said duct and vice versa, said handling device comprising:
   handling means suitable for being gripped by an operator for switching the valve from the closed configuration to the open configuration and vice versa;
   a connection device associable to said valve body, said connection device supporting said handling means;
   spring back means suitable for influencing said handling means for returning said valve from the open configuration to the closed configuration, said spring back means supported by said handling means, wherein said handling means comprise a cylindrical lining suitable for substantially housing said spring back means therein; and
   a positioning and support device suitable for positioning and supporting said spring back means relative to said handling means, wherein said positioning and support device comprises at least one pin connected to a flange integral in rotation with said on-off device of the valve.

2. A handling device according to claim 1, wherein said positioning and support device comprises two aligned pins.

3. A handling device according to claim 1, wherein said spring back means comprise a spring device.

4. A device according to claim 3, wherein said spring back means comprise a gas spring.

5. A device according to claim 4, wherein said gas spring comprises a cylinder inside which a piston is translatable.

6. A device according to claim 5, wherein said inside cylinder is supported by said handling means through a positioning and support device suitable for positioning and supporting said spring back means relative to said handling means.

7. A handling device according to claim 1, wherein said handling means comprise a lever extending along a lever axis.

8. A handling device according to claim 7, wherein said lever exhibits a housing for housing said lining.

9. A handling device according to claim 1, wherein said lining can be gripped for handling the valve.

10. A handling device according to claim 1, wherein said connection device comprises an engagement element free to rotate about an axis of rotation, cooperating with said handling means and having a seat for integrally coupling in rotation with the on-off device of said valve.

11. A handling device according to claim 10, wherein said connection device comprises a bottom plate, suitable for abutting on said valve body, and a hinging element that cooperates with said spring back means, said hinging element having a hinging axis.

12. A handling device according to claim 11, wherein said axis of rotation is parallel and separate from said hinging axis.

13. A handling device according to claim 1, wherein said connection device comprises at least one bracket for connecting said connection device to said valve body of the valve.

14. A handling device according to claim 1, wherein said connection device comprises at least one junction element for connecting said connection device to said on-off device of the valve.

15. A valve unit comprising an on-off valve and a handling device associable to said on-off valve of a fluid in a duct, wherein said on-off valve comprises a valve body and a fluid on-off device housed into said valve body, said valve being suitable for switching from a closed configuration, wherein it prevents the fluid flow into said duct, to an open configuration, wherein it allows the fluid flow into said duct and vice versa, said handling device comprising: handling means suitable for being gripped by an operator for switching the valve from the closed configuration to the open configuration and vice versa; a connection device associable to said valve body for supporting said handling means; spring back means suitable for influencing said handling means for returning said valve from the open configuration to the closed configuration; wherein said handling means support said spring back, said handling means comprise a cylindrical lining suitable for substantially housing said spring back means therein; and a positioning and support device suitable for positioning and supporting said spring back means relative to said handling means, wherein said positioning and support device comprises at least one pin connected to a flange integral in rotation with said on-off device of the valve.

16. A valve unit according to claim 15, wherein said valve is a ball valve.

17. A handling device for switching a fluid valve from an open configuration to a closed configuration and vice versa, said open configuration allowing fluid flow through said valve and said closed configuration preventing fluid flow through said valve, said handling device comprising:
   a connection device for releasably coupling with said valve, at least a portion of both said connection device and said valve being rotatable about a switching axis for said valve switching;
   a handling means supported by said connection device, said handling means including a lever for an operator to hold during said valve switching, said lever extending away from said connection device along a lever axis, wherein said lever axis is generally perpendicular to said switching axis;
   a spring back means for biasing said valve from the open configuration to the closed configuration, said spring back means substantially housed within said handling means in at least one position, said spring back means configured such that said spring back means includes a longitudinal axis extending generally along said lever axis; and
   a positioning and support device suitable for positioning and supporting said spring back means relative to said handling means;
   wherein said positioning and support device comprises at least one pin connected to a flange integral in rotation with said on-off device of the valve.

18. A handling device according to claim 17, wherein said connection device includes a hinging element having a hinging axis, said hinging element cooperating with said spring back means for said biasing, wherein said hinging axis is substantially parallel to said switching axis.

* * * * *